US012570220B2

(12) United States Patent
Tardif et al.

(10) Patent No.: US 12,570,220 B2
(45) Date of Patent: Mar. 10, 2026

(54) MOBILE DEVICE ACCESSORY HOLDER FOR VEHICLE

(71) Applicants: Alexandre Tardif, Granby (CA);
Francois Rouleau, Magog (CA);
Antoine Dallaire, Quebec (CA)

(72) Inventors: Alexandre Tardif, Granby (CA);
Francois Rouleau, Magog (CA);
Antoine Dallaire, Quebec (CA)

(73) Assignee: Bombardier Recreational Products, Inc.

( * ) Notice: Subject to any disclaimer, the term of this patent is extended or adjusted under 35 U.S.C. 154(b) by 506 days.

(21) Appl. No.: 18/110,885

(22) Filed: Feb. 16, 2023

(65) Prior Publication Data

US 2024/0278733 A1     Aug. 22, 2024

(51) Int. Cl.
B60R 11/02 (2006.01)
B60R 11/00 (2006.01)

(52) U.S. Cl.
CPC ... B60R 11/0241 (2013.01); B60R 2011/0003 (2013.01); B60R 2011/0075 (2013.01)

(58) Field of Classification Search
CPC ......... B60R 11/0241; B60R 2011/0003; B60R 2011/0075; B60R 11/02
USPC ...................................................... 455/575.9
See application file for complete search history.

(56) References Cited

U.S. PATENT DOCUMENTS

| | | | | |
|---|---|---|---|---|
| 9,278,652 | B1 * | 3/2016 | Lundsgaard | ............ B60R 11/02 |
| 11,622,032 | B2 * | 4/2023 | Wright | ................ H04B 1/3888 |
| | | | | 455/575.8 |
| 11,624,667 | B2 * | 4/2023 | Montgomery | ....... A61B 5/6898 |
| | | | | 73/720 |
| 12,130,672 | B1 * | 10/2024 | Bushnell | ............... G06F 1/1626 |
| 2017/0136188 | A1 * | 5/2017 | Marsh | ............... A61M 5/31536 |
| 2018/0218859 | A1 * | 8/2018 | Ligtenberg | ............ G06F 3/0414 |
| 2020/0377037 | A1 * | 12/2020 | Yang | ..................... H04B 1/3877 |
| 2021/0010500 | A1 * | 1/2021 | Rassam | ................. F16B 5/0657 |
| 2022/0314858 | A1 * | 10/2022 | Serpis | .................... B60R 11/02 |
| 2022/0324303 | A1 * | 10/2022 | Johananoff | ............. B60R 11/00 |
| 2022/0329678 | A1 * | 10/2022 | Zhang | .................... H04N 23/57 |
| 2023/0021943 | A1 * | 1/2023 | Ketels | .................... B60R 11/02 |
| 2023/0224391 | A1 * | 7/2023 | Hill | ..................... H04M 1/0264 |
| | | | | 455/566 |
| 2024/0217284 | A1 * | 7/2024 | Wolf | ..................... B60D 1/485 |

FOREIGN PATENT DOCUMENTS

| | | | | | |
|---|---|---|---|---|---|
| EP | 2151353 | A1 * | 2/2010 | ......... | B60R 11/0241 |
| EP | 2965833 | A2 * | 1/2016 | ....... | G05B 19/41865 |
| EP | 3166286 | A2 * | 5/2017 | .............. | H04M 1/04 |
| WO | WO-2020067604 | A1 * | 4/2020 | .......... | H04B 1/3877 |

* cited by examiner

*Primary Examiner* — Mahendra R Patel

(74) *Attorney, Agent, or Firm* — Bochner PLLC; Joseph Farco

(57) ABSTRACT

A mobile device containment system made up of a base, a cover for releasably coupling to the base such that the cover has a transparent shield. The mobile device containment system also has a retention plate bounded by the base and configured to receive an object thereon. An exemplary retention plate is flexibly coupled to the base such that the retention plate enables a bias force towards the object and against the transparent shield when the base is coupled to the cover.

10 Claims, 7 Drawing Sheets

100

100

MOBILE DEVICE ACCESSORY HOLDER FOR VEHICLE

FIELD OF THE INVENTION

The present invention relates to the field of holding mechanisms for mobile device accessories while on a vehicle.

SUMMARY

An exemplary mobile device containment system may comprise a base, a cover for releasably coupling to the base, wherein the cover has a transparent shield, and a retention plate bounded by the base and configured to receive an object thereon, wherein the retention plate is flexibly coupled to the base such that the retention plate enables a bias force towards the object and against the transparent shield when the base is coupled to the cover.

In addition to the previously described embodiment and/ or as an alternative to any other described exemplary embodiment, the mobile device containment system may further comprise an electronic plate couple to the retention plate.

In addition to the previously described embodiment and/ or as an alternative to any other described exemplary embodiment, the mobile device containment system may further comprise at least one pair of limiters disposed within the retention plate.

In addition to the previously described embodiment and/ or as an alternative to any other described exemplary embodiment, the mobile device containment system may further comprise at least two pairs of limiters disposed within the retention plate.

In addition to the previously described embodiment and/ or as an alternative to any other described exemplary embodiment, the mobile device containment system may further comprise at least two pairs of limiters disposed within the retention plate and at least two limiters in the at least two pairs of limiters are oriented substantially orthogonal to one another about the retention plate.

In addition to the previously described embodiment and/ or as an alternative to any other described exemplary embodiment, the mobile device containment system may be configured such that the object is a mobile phone.

In addition to the previously described embodiment and/ or as an alternative to any other described exemplary embodiment, the mobile device containment system may further comprise at least one resistance heating element disposed on the electronic plate.

In addition to the previously described embodiment and/ or as an alternative to any other described exemplary embodiment, the mobile device containment system may further comprise an electronic plate couple to the retention plate and configured to heat or electrically connect to the mobile phone.

A mobile device containment system may comprise a base, a cover for releasably coupling to the base such that the cover has a transparent shield, and a retention plate coupled to the base via a plurality of springs, such that when an object is received on the retention plate and the cover is coupled to the base, the retention plate presses the object into contact with the transparent shield.

In addition to the previously described embodiment and/ or as an alternative to any other described exemplary embodiment, the mobile device containment system may be configured such that the retention plate receives the object using a plurality of limiters disposed within the retention plate.

In addition to the previously described embodiment and/ or as an alternative to any other described exemplary embodiment, the mobile device containment system may be configured such that the cover couples to the base via a snap-fit connection.

In addition to the previously described embodiment and/ or as an alternative to any other described exemplary embodiment, the mobile device containment system may be configured such that the electronic plate is configured to electronically couple to a vehicle to which the mobile device containment system is coupled.

In addition to the previously described embodiment and/ or as an alternative to any other described exemplary embodiment, the mobile device containment system may be coupled to a vehicle.

In addition to the previously described embodiment and/ or as an alternative to any other described exemplary embodiment, the mobile device containment system may be coupled to a vehicle such that the electronic plate may be powered by the vehicle.

In addition to the previously described embodiment and/ or as an alternative to any other described exemplary embodiment, the mobile device containment system may be coupled to a vehicle while containing a mobile device, such as a mobile phone or smart device.

Figure 1:
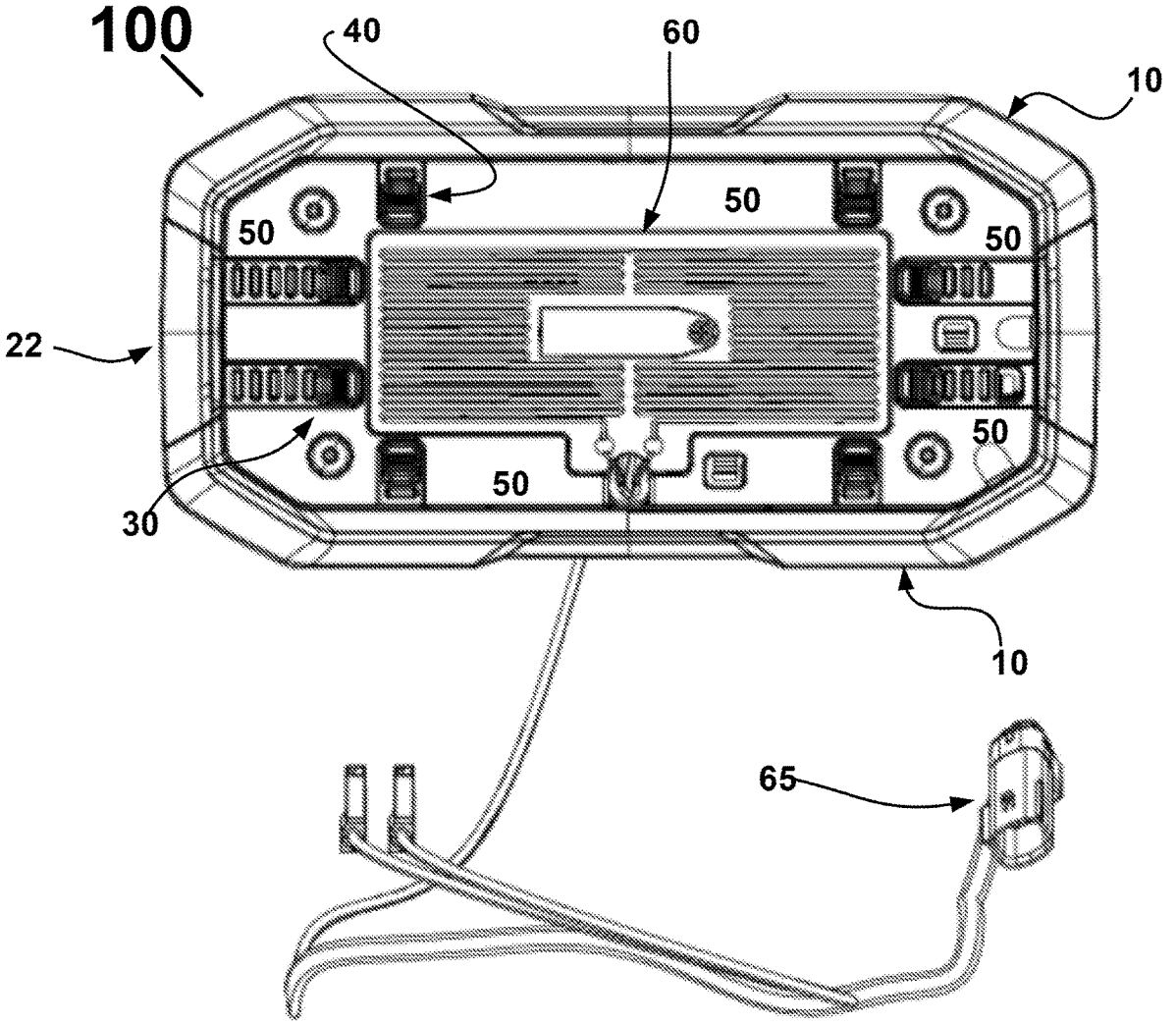
FIG. 1 illustrates an exemplary front view of an exemplary mobile device accessory holder for a vehicle according to exemplary embodiments of the inventions disclosed herein.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

With reference to the illustrative embodiments described herein and illustrated in FIGS. 1 and 3-7, an exemplary mobile device accessory holder for a vehicle (or "MDAH") 100 may comprise a cover 10 for frictionally or otherwise mechanically attaching to a base 20 by way of interlocking cover grips 11 and base grips 21 and/or clasps 22. An exemplary cover 10 may retain within its perimeter a transparent shield 12, which may be a resilient enough polymer or other transparent material that is suitably resilient against the rigors, shock forces, vibrations, and other forces experienced during vehicle use (e.g., traversing snowy terrain by a snowmobile, traversing rocky terrain by an all-terrain vehicle, traversing wake and waves by a personal watercraft). Similar material may be used to make up cover 10 and base 20, e.g., high strength and high shock resistance plastics, metals, or other like materials. Additionally, transparent shield 12 may be suitable for use with touch capacitive mobile devices 200 while providing sufficient protection against elements experienced by the vehicle to which MADH 100 is coupled.

Figure 7:
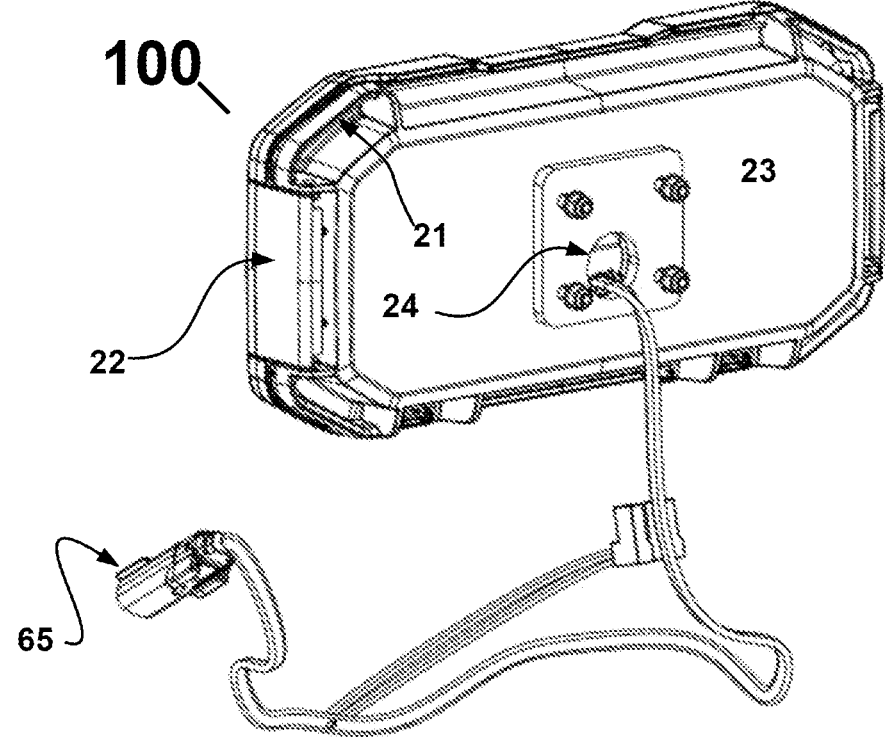
FIG. 7 illustrates an exemplary rear view of an exemplary mobile device accessory holder for a vehicle according to exemplary embodiments of the inventions disclosed herein.

As may be illustrated with reference to FIG. 7, the rear 23 of base 20 may provide for an aperture 24 through which electronic leads 65 may pass for connecting to appropriate leads of a motor vehicle. In an exemplary embodiment, electronic leads 65 provide power to a circuit plate 60 disposed within walls 26 on top of a retainer plate 50 moveably coupled to the support surface 25 of MDAH base 20. According to this exemplary embodiment, circuit plate 60 may comprise a heating element built from one or more winding arrangements of resistance heating. In one aspect, when circuit plate 60 operates as a heating element, it may be used to maintain an appropriate temperature for a particular mobile device 200 stored within MDAH 100, which has the benefits of preserving battery life and/or operation of the mobile device 200 in a particular environment (e.g., excessive cold weather, very humid weather). Alternatively and/or additionally, circuit plate 60 may also contain a charging dock feature to continuously power the mobile device 200 while within the MDAH 100. In certain aspects, the electronics that enable circuit plate 60 to operate as a resistance heater may be operated in series and/or in parallel with those elements that may charge the mobile device 200. When connected in parallel, circuit plate 60 may enable continuous charging of the mobile device 200 in the event the current is insufficient to power the resistive heating mechanisms of the MADH 100. In a still further embodiment, circuit plate 60 may also enable scannable material (e.g., QR codes) and other electronic interactive features known to those skilled in the art to enable the mobile device 200 to interact with either the vehicle or other remote content (e.g., GPS, trail maps and/or routes, safety contact information, maintenance information, OBD information for the vehicle, video recording features).

Figure 2A:
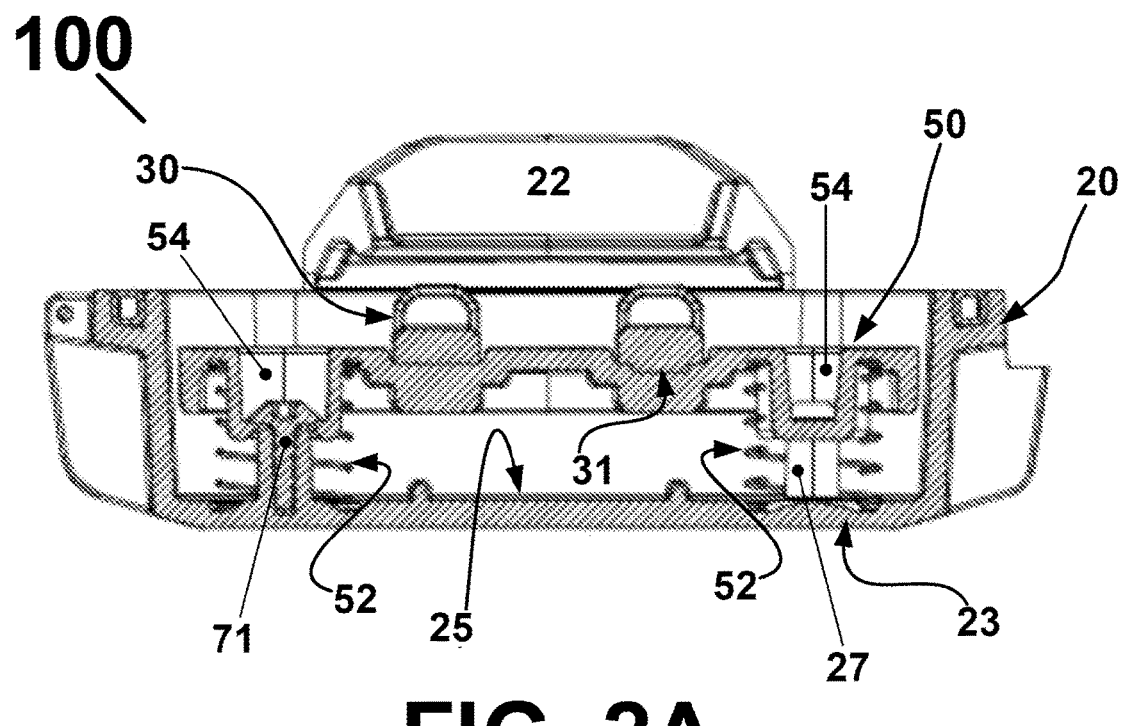
FIGS. 2A-B illustrate exemplary sectioned views of a mobile device accessory holder for a vehicle with and without a mobile device therein according to one exemplary embodiment of the inventions disclosed herein.

According to another exemplary embodiment, a retainer plate 50 may be disposed within walls 26 of base 20 using one or more attachment mechanisms 71 to couple retainer plate 50 to one or more mounts 27 extending from support surface 25 via channels 54 in retainer plate 50. In an exemplary embodiment, mechanism 71 may be a screw, bolt, clip, or other mechanical or chemical forms of adhesion between surfaces known to those skilled in the art. In yet another exemplary embodiment, retainer plate 50 may be coupled to base 20 via one or more compression springs 52 configured to circumscribe the mounts 27 of the base 20. While compressions springs 52 may be used in the illustrative embodiments, it should be understood that any form of elastic compression mechanisms may be implemented without departing from the spirit of this disclosure, such as, for example, leaf springs, compression balls, elastomer diaphragms. In an exemplary operating method, as may be illustrated with reference to FIGS. 2A-2B, an exemplary retainer plate 50 may be biased away from support surface 25 via springs 52 when in an unloaded configuration and then be biased toward the support surface 25 when mobile device 200 may be loaded within the MADH 100, as may be understood with particular reference to FIG. 2B.

According to yet another embodiment of an exemplary MADH 100, an exemplary retainer plate 50 may also have opposing length wise limiters 30 that may be adjustable using friction-fit surfaces 31 that enable controlled and movement resistance to place a limiter 30 surface against a mobile device 200. Similarly, opposing width-wise limiters 40 may also be located within retainer plate 50 to provide similar controllable and friction-fitting about a particular mobile device 20. According to this exemplary embodiment, retainer plate 50 in combination with limiters 30 and 40 may be used to grip the edges of a mobile device 200 to reduce movement of the mobile device 200 within the MADH 100 during vehicle operation.

In another exemplary embodiment, an exemplary mobile device 200 may be firmly held in place within an exemplary MADH 100 when clasps 22 interlock about cover 10 such that transparent shield 12 may be pressed against the front face of mobile device 200. Alternatively and/or additionally to the above exemplary embodiment(s), an exemplary retainer plate 50 in an exemplary MADH 100 may bias the mobile device 200 against the transparent shield 12 via springs 52 exerting their spring forces against base support surface 25. Further alternatively and/or additionally to the above exemplary embodiment(s), one or more pairs of opposing limiters 30 and/or 40 may be frictionally adjusted within retainer plate 50 to hold mobile device 200 in place atop retainer plate 50 while being housed within MADH 100. Even further alternatively and/or additionally to the above exemplary embodiment(s), an exemplary retainer plate 50 may further hold an exemplary electronic plate 60 within a repository zone 51 to enable one or more electronic interactions with the mobile device 200, e.g., heating using resistance heating, charging, and/or wireless or other connectivity to the vehicle, internet, GPS, video/audio recording.

It should be understood that any part of MADH 100 may be made from any material or combination of materials to effect the purpose of the various embodiments herein, and may include plastics, metals, and ceramics, depending on needs. In a preferred embodiment, MADH 100 may be made up of all plastic components to reduce cost and be more lightweight.

Figure 2B:
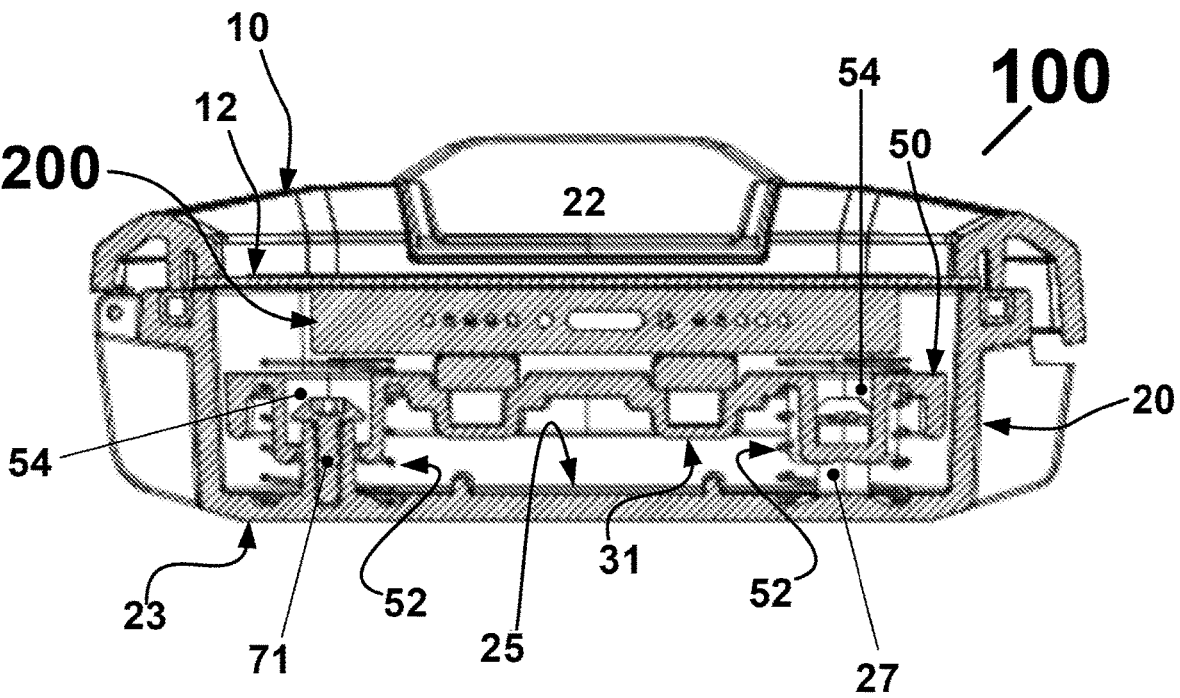
Figure 3:
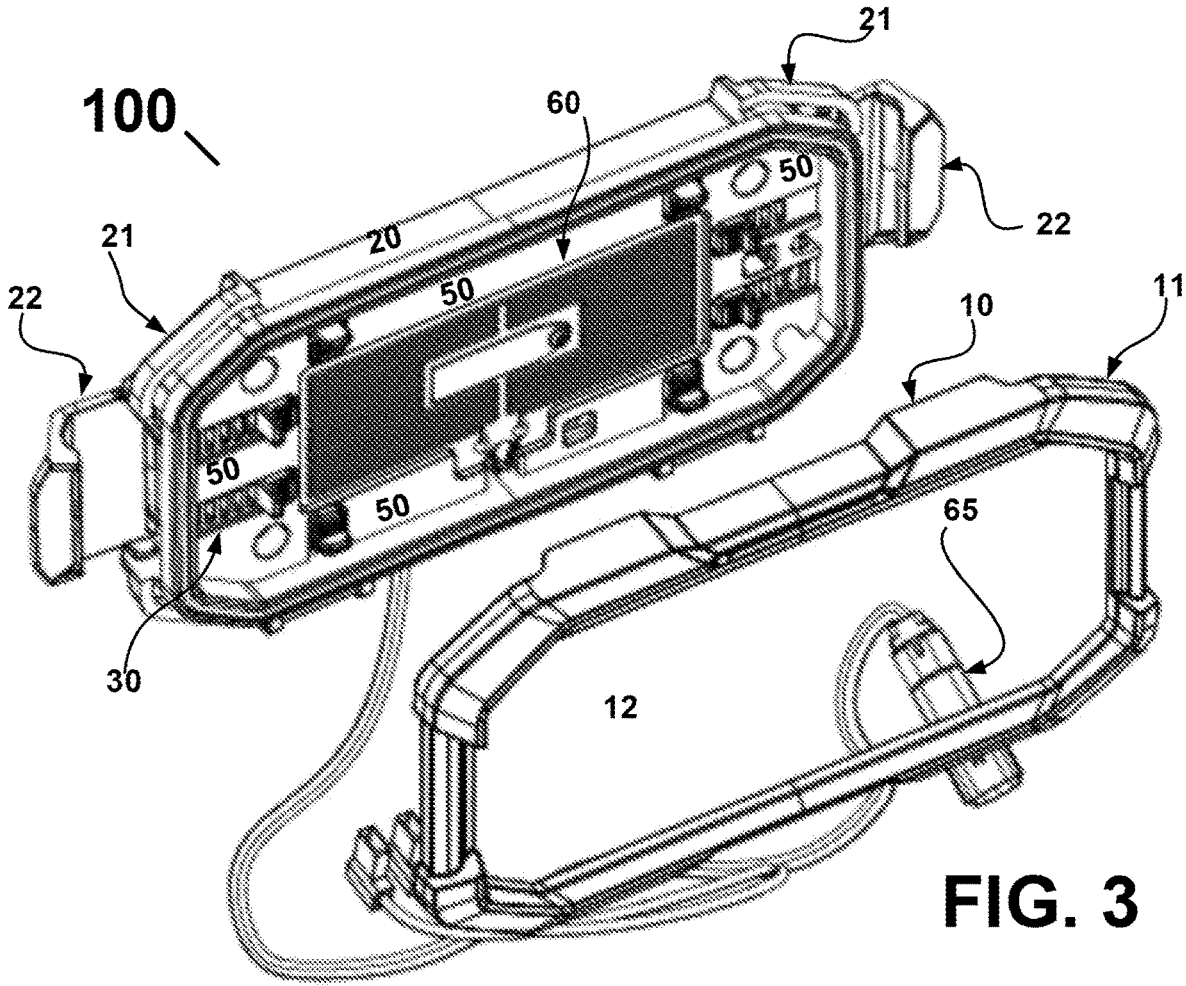
FIG. 3 illustrates an exemplary isometric exploded view of an exemplary mobile device accessory holder for a vehicle according to exemplary embodiments of the inventions disclosed herein.
Figure 4:
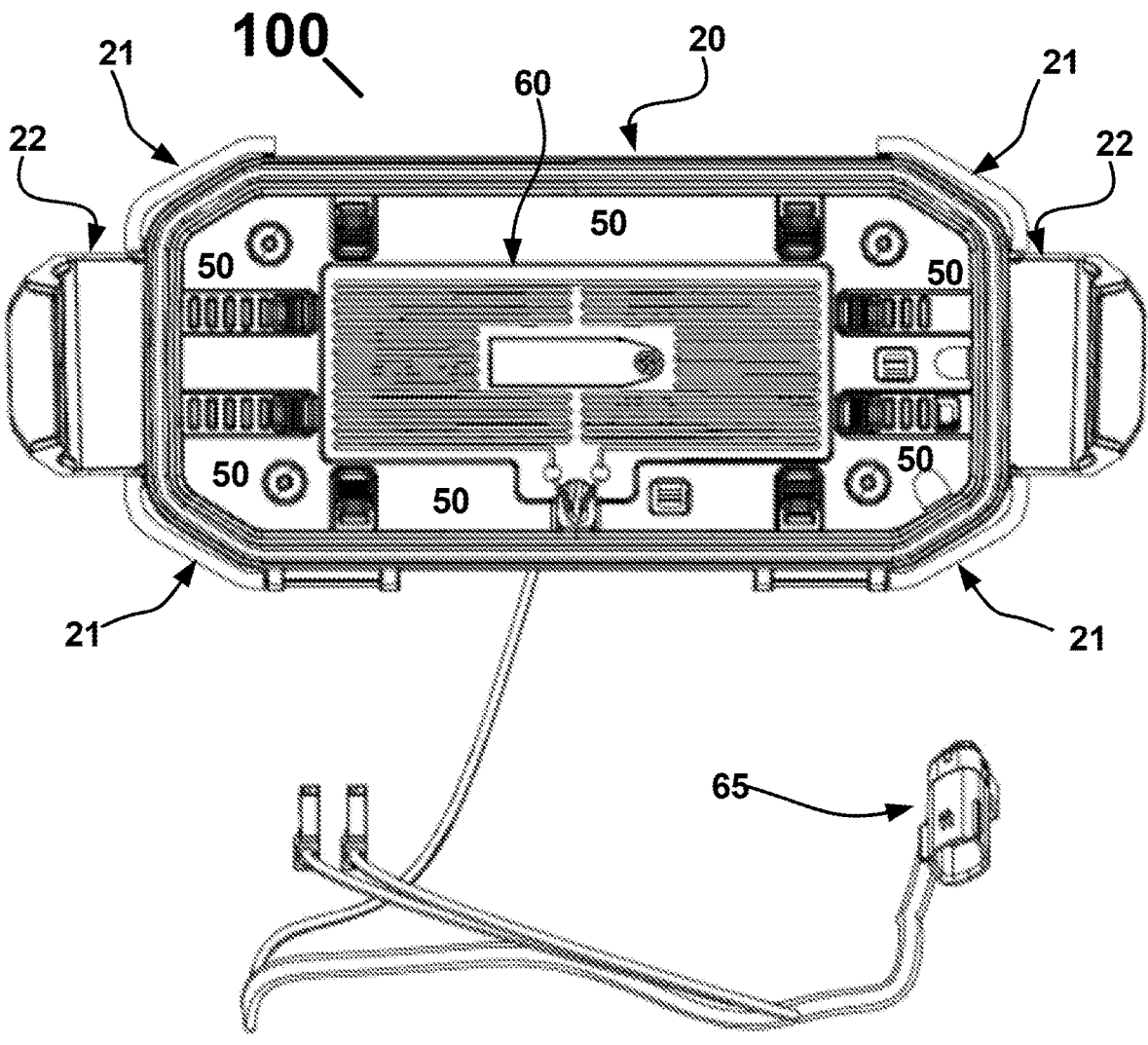
FIG. 4 illustrates an exemplary mobile device accessory holder for a vehicle with its front cover removed according to an aspect of the inventions disclosed herein.
Figure 5:
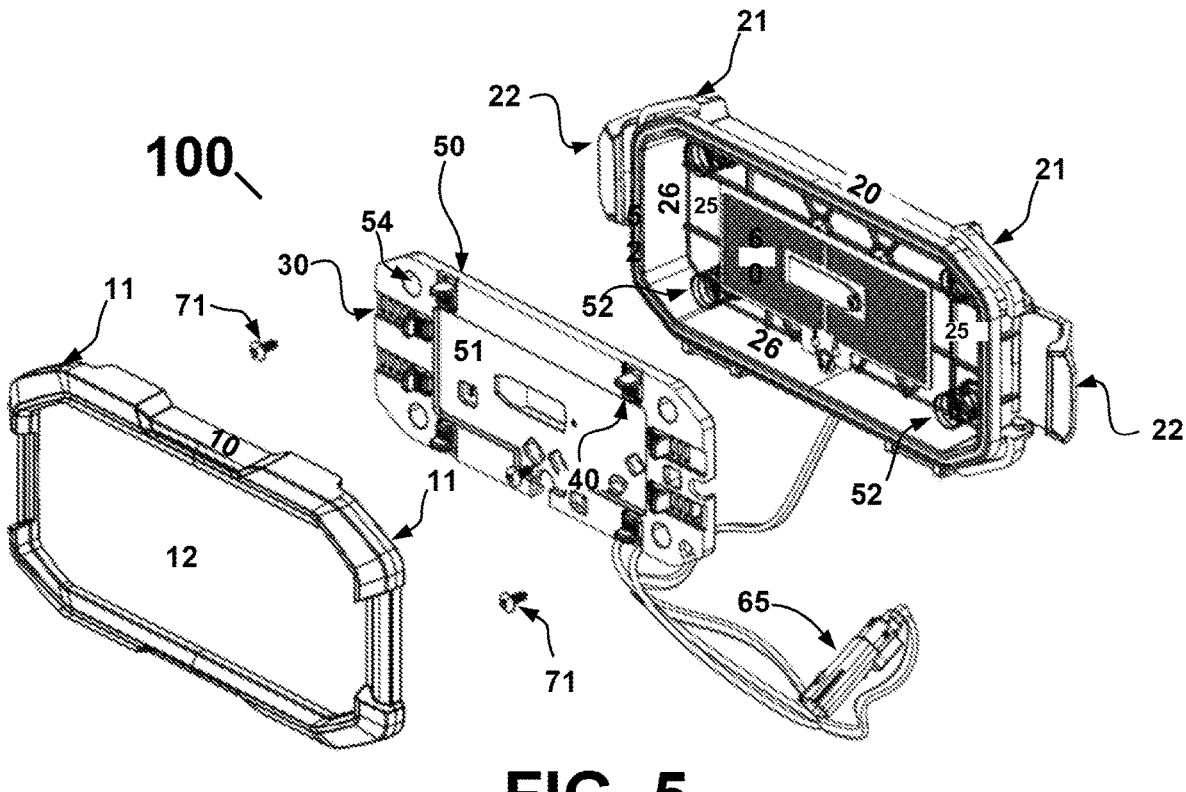
FIGS. 5 and 6 each illustrates another exemplary isometric exploded view of an exemplary mobile device accessory holder for a vehicle according to exemplary embodiments of the inventions disclosed herein.
Figure 6:
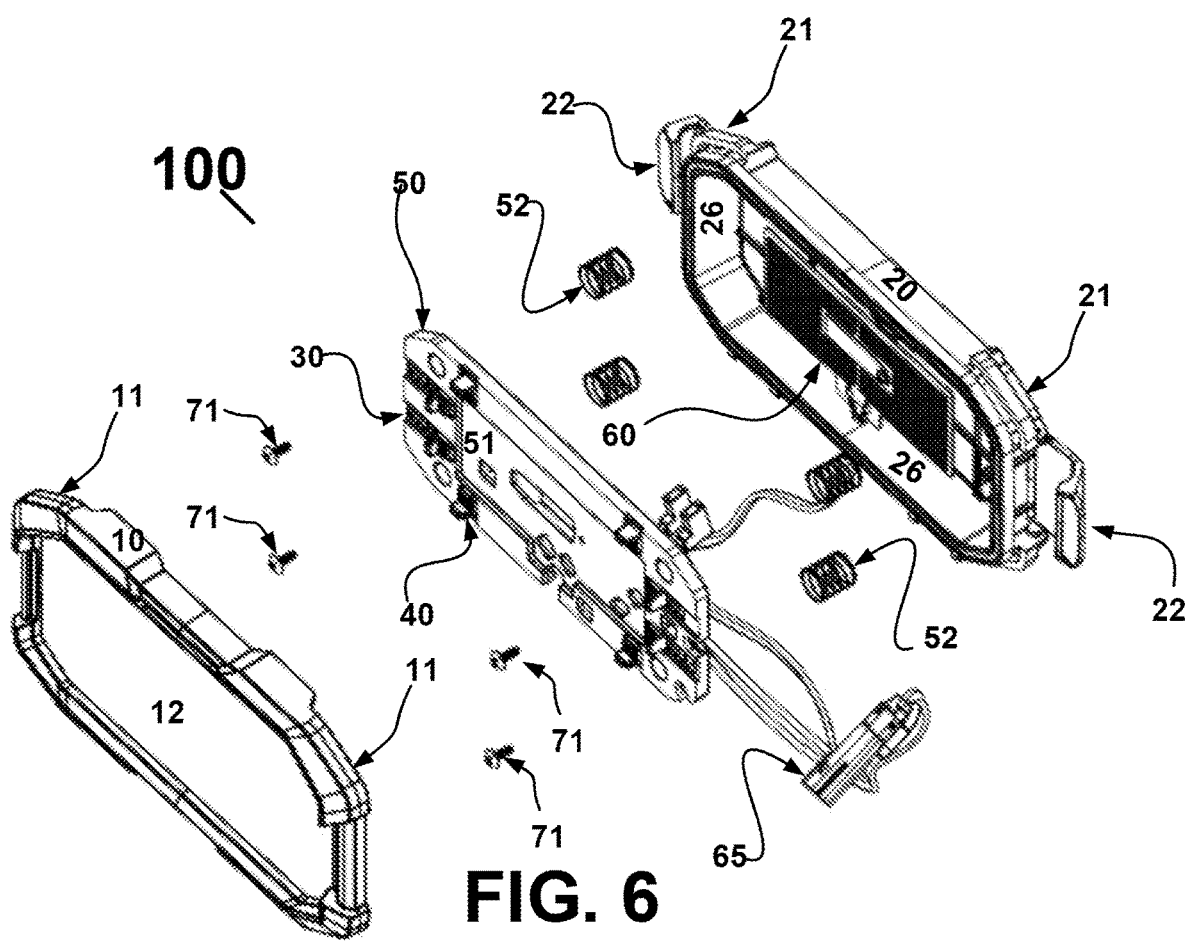

In another alternative embodiment, MADH 100 may operate such that the clasps 22 of base 20 may be the only means of biasing of retainer plate 50 against the support surface 25 of the base 20. In other words, according to this alternative embodiment, springs 52 may be resilient enough so that they do not substantially deflect when mobile device 200 is loaded on retainer plate 50 and before cover 10 is clasped by the clasps 22 of base 20. Accordingly, when clasps 22 interlock with the complementary portions 11 of cover 10, the interaction between clasps 22 and portions 11 of cover 10 then press the mobile device 200 and retainer plate 50 into the illustrated biased position within MADH 100 as shown in FIG. 2B. To those skilled in the art, a more resilient spring 52 and/or biasing mechanisms known to those skilled in the art may be preferable to less resilient springs 52 which may have the tendency to bias easily during vehicle operation. Therefore, in a preferred embodiment, the resilience of springs 52 may be such that they remain unbiased unless and until cover 10 may be clasped to base 20 as previously described.

In another exemplary embodiment, limiters 30 and 40, while shown as being slidingly coupled within retainer plate 50, may be any other form or configuration to effect lengthwise and width wise retention of the mobile device 200. In one alternative, limiters 30/40 may be cam-like dials that can be turned until the mobile device 200 is fixed tightly between the same. In another alternative, limiters 30/40 may also be spring biased towards a minimum distance from their opposing limiter and then may be expanded upon insertion of the mobile device 200 therebetween. According to this alternative embodiment, a spring biased limiter 30/40 may use the same type of resiliency forces to ensure a tight hold of mobile device 200 within MADH 100.

While MADH 100 may be shown in a particular shape and arrangement, it should be understood that an MADH 100 may be any other type of size and shape configurations that enable the operations disclosed. Additionally, an MADH 100 may house one or more mobile devices 200, depending on the arrangement of limiters 30/40 on configuration of retainer plate 50, cover 10, and base 20. Further alternatively, an exemplary MADH 100 may have tethered items connected thereto that work in conjunction with electronic plate 60 to allow user interaction with the mobile device 200 from behind transparent shield 12, e.g., stylus, pointers, keyboards, etc. that are also connected to electronic plate 60 and/or power source 65 through rear 23 of MADH 100. In this way, an exemplary MADH 100 may allow for users to make use of their mobile devices 200 while operating vehicles in terrain that are susceptible to environmental intrusions such as water, mud, snow, dust, dirt, and ice.

Even further alternatively, MADH 100 may also supply other tethered items or embedded items coupled to cover 10 and/or base 20, such as miniature brushes, LED lighting (e.g., inside cover 10 and/or base 20).

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A mobile device containment system, comprising:
   a base;
   a cover for releasably coupling to the base, wherein the cover has a transparent shield; and
   a retention plate bounded by the base and configured to receive an object thereon, wherein the retention plate is flexibly coupled to the base such that the retention plate enables a bias force towards the object and against the transparent shield when the base is coupled to the cover.

2. The mobile device containment system of claim 1, further comprising an electronic plate couple to the retention plate.

3. The mobile device containment system of claim 1, further comprising at least one pair of limiters disposed within the retention plate.

4. The mobile device containment system of claim 3, further comprising at least two pairs of limiters disposed within the retention plate.

5. The mobile device containment system of claim 3, further comprising at least two pairs of limiters disposed within the retention plate and at least two limiters in the at least two pairs of limiters are oriented substantially orthogonal to one another about the retention plate.

6. The mobile device containment system of claim 1, wherein the object is a mobile phone.

7. The mobile device containment system of claim 2, further comprising at least one resistance heating element disposed on the electronic plate.

8. The mobile device containment system of claim 6, further comprising an electronic plate couple to the retention plate and configured to heat or electrically connect to the mobile phone.

9. A vehicle to which the mobile device containment system of claim 1 couples.

10. A vehicle to which the mobile device containment system of claim 6 couples.

* * * * *